Nov. 26, 1968

R. A. LATTA 3,412,746

FLOW BALANCER

Filed Sept. 12, 1966

INVENTOR.
Robert A. Latta
BY
Paul Fitzpatrick
ATTORNEY

United States Patent Office 3,412,746
Patented Nov. 26, 1968

3,412,746
FLOW BALANCER
Robert A. Latta, Indianapolis, Ind., assignor to General Motors Corporation, Detroit, Mich., a corporation of Delaware
Filed Sept. 12, 1966, Ser. No. 578,539
10 Claims. (Cl. 137—118)

My invention relates to flow balancing devices, by which I mean devices which act to control flow through a plurality of paths so that the relative flows through the several paths remain substantially constant with variations in total flow, notwithstanding external disturbances in the system such as changes in supply pressure or variations in back pressure external to the flow balancing device.

Such devices are well known and have been employed for such purposes as maintaining substantially equal fuel flow to a number of fuel nozzles in a gas turbine engine, balancing the flow of hydraulic actuating fluid to a number of power cylinders, and balancing flow from a number of sources such as aircraft fuel tanks to a common manifold or discharge line.

While there are various types of balancing devices, my invention relates to the general type in which throttling valves in the several branch lines or paths are actuated in response to flow in the lines so as to maintain the desired proportionality between the branch line flows. The preferred application of my device is to equalizing flow to a number of fuel nozzles in a gas turbine engine. It is particularly advantageous in this case because it has novel provisions adapting it to accurate proportioning of flows over a wide range of total flow. However, the principles of my flow balancer are applicable to various other uses, such as those mentioned above.

Balancing devices of the general type to which my invention is an improvement go back at least as far as U.S. Patent No. 1,999,834 to Hans Ernst, Apr. 30, 1935. The use of such a device with gas turbine fuel nozzles is illustrated in Whittle British Patent No. 577,132 accepted in 1946, and a prior system is also shown in U.S. Patent No. 2,821,992 of Richards and Snoy. In general, devices of this sort rely on the pressure drop across fixed metering orifices as a measure of flow and employ the pressure drop to control variable throttling valves which vary the resistance to flow in branch lines so that the flows are maintained equal or proportional notwithstanding variations in the flow resistance or static head in the branch lines.

Briefly, my preferred flow balancer embodies means responsive to total flow effective to vary concurrently the resistance to flow of the metering orifices in the branch paths so that this resistance decreases with increase in total flow so that the pressure drops across the metering orifices are relatively invariant with changes in overall flow level. The result is that my balancing device can function with a high degree of accuracy over a wide range of flows and may function effectively at relatively low flows without burdening the system with high pressure drops at high rates of flow. This is quite significant in gas turbine fuel systems, for example, because the rate of flow to the fuel nozzles of a gas turbine, particularly an aircraft gas turbine, may vary quite widely with changes in power demand and ambient conditions.

The principal objects of my invention are to improve the operation of hydraulic systems such as gas turbine fuel distribution systems, to provide an improved flow balancing device, to provide a flow balancing device in which flow through branch paths is controlled by means responsive to the pressure drop through an orifice variable with the total flow in the system, to provide a flow balancer having improved accuracy and responsiveness over a wide range of fluid flow, to provide a flow balancer having a relatively constant pressure drop over a very considerable range of flow, and to provide a flow balancer in which a master flow responsive device in a common passage varies the setting of flow metering devices in branch passages connected to the common passage.

The nature of my invention and the advantages thereof will be clear to those skilled in the art from the succeeding detailed description of the preferred embodiment of the invention and the accompanying drawings thereof.

Figure 1:
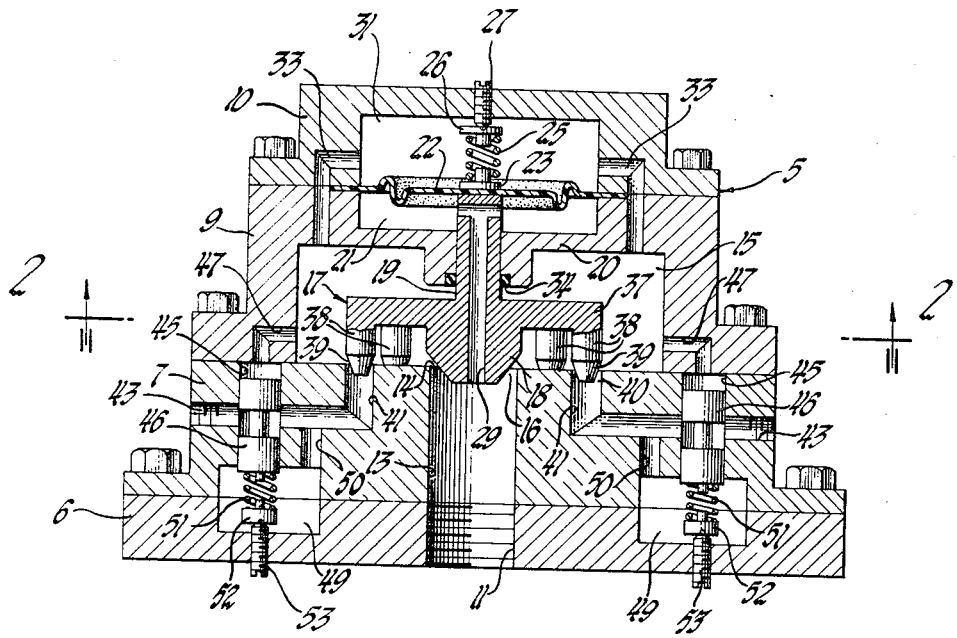
FIGURE 1 is a somewhat schematic sectional view of a flow balancer incorporating the invention.
Figure 2:
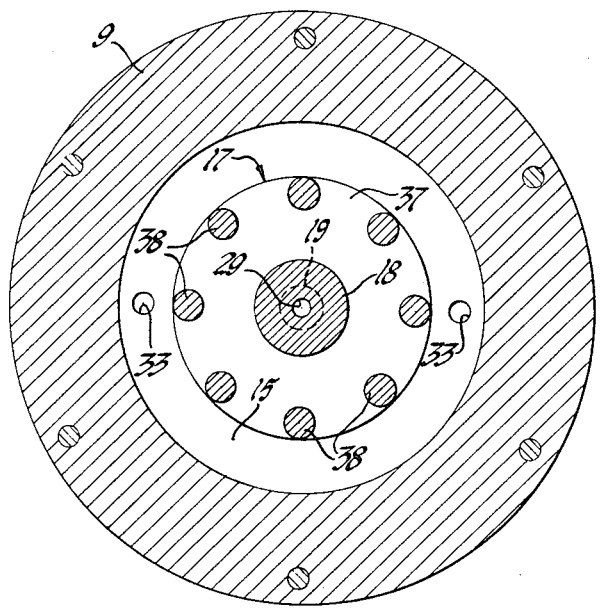
FIGURE 2 is a sectional view of the same on the plane indicated by the line 2—2 in FIGURE 1.

Referring to the drawings, my flow balancing device comprises a housing indicated generally as 5 including a base plate 6, a valve block 7, a master valve case 9, and a cover 10, all suitably fixed together. A fluid connection 11 is defined in the base plate 6. In the succeeding description it will be assumed that flow enters the device through inlet 11 but it should be recognized that 11 could be an outlet in case the device is modified for reverse flow. Inlet 11 communicates with a passage or common flow path 13 in valve block 7 which terminates in an annular valve seat 14 opening into chamber 15 within the master valve case 9.

A reciprocable valve member 17 in chamber 15 embodies a central conical valve plunger 18 cooperating with the seat 14 to define a master variable throttling valve 16. Valve member 17 is integral with a stem 19 reciprocable in the upper wall 20 of the case 9. This upper wall is recessed to define a chamber 21 below a diaphragm 22 impinged between the case 9 and cover 10. The center of diaphragm 22 is held against the stem 19 by an abutment 23 for a compression spring 25 which bears against a second abutment 26 adjustable by a screw 27 in the cover 10. The recess 21 below diaphragm 22 is in communication with the common passage 13 through a central port 29 in the valve member 18 and stem 19. A chamber 31 in the cover is in open communication with chamber 15 in the case through one or more passages 33 extending through the upper wall of the case and the cover. Obviously, therefore, valve plunger 18 is biased by spring 25 which tends to close the master throttling valve by the pressure upstream of the valve which tends to open it and by the pressure downstream of the valve which tends to close it. As a result valve member 18 tends to move so as to maintain a constant pressure drop between inlet 13 and chamber 15 which is determined by the effective area of the diaphragm and the force of spring 25. Spring 25 may be adjusted to preset this pressure drop. Valve 16 may be termed a constant pressure difference valve or a resistance valve. An O-ring 34 prevents leakage from chamber 21 into chamber 15.

The valve member 17 in addition to the master valve plunger 18 includes a disk or spider 37 from which depend a number of stems 38, each of which terminates in a conical valve member or plunger 39 adapted to cooperate with the seat defined by the opening of a branch flow path 41 in the valve block 7 to define a branch path throttling valve 40. Each branch flow path connects with an outlet 43 threaded or otherwise suitably adapted for connection to an external line.

Each passage 41 intersects a transverse bore 45 which serves as a cylinder for a variable throttling valve operative to control flow from the branch passage to its outlet. Each valve cylinder houses a valve spool 46 movable to throttle flow through passage 41. The upper end of each cylinder 45 is in communication with chamber 15 through a passage 47 in the master valve case. The lower end of each valve spool is exposed to pressure in an individual chamber 49 defined by recesses in the valve block and base plate connected to passage 41 by a branch 50. Each spool is biased upwardly (in the direction to decrease resistance to flow) by a compression spring 51 engaging the lower end of the valve spool and an abutment 52 adjustably set by a screw 53.

Considering now the operation of the device, we may assume that fluid is supplied by such means as a pump and flow control device (not shown) to the inlet 11 and is discharged from the outlets 43 to using devices such as fuel nozzles. The fluid acts to lift valve member 17, opening the master throttling valve 16. Note that this pressure acts both on the end of plunger 18 and upon the lower surface of diaphragm 22. The pressure downstream of the valve in chamber 15 acts on the upper surface of diaphragm 22, as does spring 25. As the valve opens and the pressure in chamber 15 increases, a balanced condition will be reached in which the pressure difference across valve 16 balances the resisting force of spring 25. Subject to some variation because of the rate of spring 25, there is thus a substantially constant pressure drop from inlet 13 to chamber 15 and, as the flow varies, the valve member 17 moves to vary the effective flow area of the master valve 16 so as to maintain this substantially constant pressure drop. Thus, the greater the total flow, the greater the movement of valve member 18 from its seat.

Each of the branch passages 41 takes fluid from chamber 15 through the throttling means 40 including its individual valve member 39 which is rigid with valve member 18 and moves with it. Thus, all of the first throttling valves 40 are varied concurrently and in response to the total flow. Valve members 39 are so proportioned that the effective flow area through each of these always remains proportional to the effective flow area through the others. Also, the ratio of the effective flow area through master valve 16 to the total effective flow area through valves 40 should remain substantially constant so that the pressure drops across valves 40 remain approximately the same at all levels of total flow. The effective flow areas may be defined for our purposes as the flow through the valve divided by the square root of the pressure difference across it for any given fluid. Assuming that equal flow for all the paths is desired, the effective area of all the valves 40 for position of the member 17 will be the same. However, any desired ratio between the effective areas of these members can be attained by suitably proportioning the sizes of the valves or the contours of the plungers to control the width of the gap between the valve plunger and the seat.

All of the valve plungers 39 control flow from a common chamber 15 and thus have the same supply pressure. Since they have the desired proportionality of effective area, the pressure drops across all of the valves 39 will be the same when the branch flows are in the desired ratio. In other words, for all valve spools 46 the pressure difference between that in chamber 15 exerted in the upper end of the spool and that in passage 41 exerted on the lower end of the spool should be equal. The springs 51 are adjusted to provide an equal load on each of the valve spools 46. Thus, if flow is out of balance, the pressure drop across the valve 40 will be different from that for which the second throttling valve 46 is set and valve 46 will move to increase or decrease its resistance to flow to correct the flow through passage 41 to the outlet 43. For example, if resistance to flow external to a given outlet 43 decreases, flow through passage 41 will increase, the pressure drop through the orifice 40 will increase, the pressure below valve spool 46 will decrease, and the valve spool will be moved downwardly as illustrated to throttle flow and bring the pressure drop across orifice 40, and therefore flow, to normal. Clearly, springs 51 should have a low rate to minimize the effect of travel of the valve spool 46 on the spring force and, therefore, on the pressure drop across the throttling valve 39.

If, for example, the total flow through the system is increased, the master throttling valve 16 and all of the branch throttling valves 40 will open and the pressure drops from the inlet 11 to chamber 15 and from chamber 15 to the branch passages 41 will change but slightly or negligibly. The valve spools 46 may remain substantially in the position which they have previously adopted to trim or compensate for any variations in the static head or frictional resistance to flow in the external lines.

The flow balancing device has been described in connection with a system in which a common inflow is divided between a number of outlets. It will be apparent that the same principles may be applied with slight variations in structure to a system in which a number of inlets are connected to a common outlet and it is desired to maintain a desired proportion between the contributions from the several inlets to the common outlet.

The somewhat schematic showing of the balancer emphasizes that specific value structures and details are unimportant and may be widely varied, as long as the elements are consistent with the successful operation of the system. Specifically, the throttling valves 40 may be similar in structure to the valves 31, 33 of U.S. Patent No. 2,731,976 of Orent et al. Seals and gaskets may be provided as needed. A piston rather than a diaphragm may operate the valve member 17.

The detailed description of the preferred embodiment of the invention for the purpose of explaining the principles thereof is not to be considered as limiting or restricting the invention, since many modifications may be made by the exercise of skill in the art.

I claim:

1. A flow balancing device comprising, in combination,
   means defining a common fluid flow path
   means defining a plural number of branch fluid flow paths each connected to the common path
   a first variable throttling means in each branch path
   means responsive to flow in the common path operative to vary the said first throttling means concurrently so that the resistances to flow of the first throttling means decrease wih increase in flow in the common path
   second variable throttling means in each branch path connected in series with the first throttling means therein
   and means responsive to the pressure drop across the first throttling means in each path connected to vary the second throttling means in the same path so as to maintain a substantially constant pressure drop across the first throttling means.

2. A device as recited in claim 1 in which the means responsive to flow in the common path includes a master throttling means having a movable master valve member and the first throttling means include movable valve members coupled to the master valve member for concurrent movement therewith.

3. A device as recited in claim 2 in which the valve members are so constructed that the effective area of the master throttling means remains in substantially constant ratio to the sum of the effective areas of the first throttling means during movement of the valve members.

4. A device as recited in claim 1 in which the said first throttling means includes movable valve members in the several branch paths coupled together for concurrent movement.

5. A device as recited in claim 4 in which the valve members are so constructed that the effective areas of the first throttling means remain in a substantially constant proportion during movement of the valve members.

6. A device as recited in claim 5 in which the means responsive to flow in the common path includes a master throttling means having a movable master valve member coupled to the valve members of the first throttling means for concurrent movement.

7. A flow balancing device as recited in claim 1 in which the means responsive to flow in the common path comprises a master variable throttling valve in that path
and means responsive to flow in the common path effective to increase the effective area of the master throttling valve with increase in flow in that path
and the device includes means coupling the master throttling valve to the said first throttling means for concurrent variation of the effective areas of the first throttling means with that of the master throttling valve.

8. A flow balancing device as recited in claim 7 in which the master and first throttling valves embody a common movable member defining movable valve members of the said master and first throttling valves.

9. A flow balancing device as recited in claim 1 in which the means responsive to flow in the common path is a resistance valve maintaining a substantially constant pressure difference between the common path and the branch paths.

10. A flow balancing device comprising, in combination,
means defining a common fluid flow path
means defining a plural number of branch fluid flow paths each connected to the common path
a resistance valve connecting the common path to the branch paths movable to maintain a substantially constant pressure differential between the common path and the branch paths
a first variable throttling means in each branch path
means responsive to movement of the resistance valve operative to vary the said first throttling means concurrently so that the effective areas of the first throttling means each increase substantially proportionally to increase in effective area of the resistance valve
second variable throttling means in each branch path connected in series with the first throttling means therein
and means responsive to the pressure drop across the first throttling means in each path connected to vary the second throttling means in the same path so as to maintain a substantially constant pressure drop across the first throttling means.

References Cited
UNITED STATES PATENTS

| | | | |
|---|---|---|---|
| 2,500,627 | 3/1950 | Chinn | 137—118 |
| 2,700,394 | 1/1955 | Jay | 137—118 |
| 2,731,976 | 1/1956 | Orent et al. | 137—118 |
| 2,832,368 | 4/1958 | Freer | 137—118 |

M. CARY NELSON, *Primary Examiner.*

R. J. MILLER, *Assistant Examiner.*